(12) United States Patent
Parry

(10) Patent No.: US 7,002,703 B2
(45) Date of Patent: Feb. 21, 2006

(54) AUTOMATIC DOWNLOAD TO PRINT JOB RETENTION

(75) Inventor: Travis Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 887 days.

(21) Appl. No.: 09/765,186

(22) Filed: Jan. 18, 2001

(65) Prior Publication Data

US 2002/0093676 A1   Jul. 18, 2002

(51) Int. Cl.
G06F 15/00   (2006.01)

(52) U.S. Cl. .................. 358/1.15; 358/1.15; 358/442; 709/203

(58) Field of Classification Search ............ 358/1.15, 358/442; 709/220, 203, 206; 707/1; 455/466, 455/456.6; 713/201, 170; 379/88.13, 905; 370/423, 427
See application file for complete search history.

(56) References Cited

U.S. PATENT DOCUMENTS

| | | | |
|---|---|---|---|
| 5,483,653 A | 1/1996 | Furman | |
| 5,790,977 A | 8/1998 | Ezekiel | |
| 5,901,286 A | 5/1999 | Danknick et al. | |
| 5,944,791 A | 8/1999 | Scherpbier | |
| 5,956,487 A | 9/1999 | Venkatraman et al. | |
| 5,995,723 A | 11/1999 | Sperry et al. | |
| 5,999,945 A | 12/1999 | Lahey et al. | |
| 6,003,078 A | 12/1999 | Kodimer et al. | |
| 6,031,623 A | 2/2000 | Smith et al. | |
| 6,040,917 A | 3/2000 | Campbell et al. | |
| 6,052,198 A | 4/2000 | Neuhard et al. | |
| 6,061,715 A | 5/2000 | Hawes | |
| 6,067,565 A | 5/2000 | Horvitz | |
| 6,101,510 A | 8/2000 | Stone et al. | |
| 6,134,584 A | 10/2000 | Chang et al. | |
| 6,184,996 B1 * | 2/2001 | Gase .................... | 358/1.15 |
| 2002/0036793 A1 | 3/2002 | Roosen et al. | |
| 2003/0182263 A1 * | 9/2003 | Augustine et al. ...... | 707/1 |

* cited by examiner

*Primary Examiner*—Kimberly Williams
*Assistant Examiner*—Saeid Ebrahimi

(57) ABSTRACT

The present invention provides methods of using an embedded Web server on a printing device to automatically download desired web-based data from a remote Web site, as well as methods for storing the downloaded information in a printer-associated cache (job retention) for later printing and/or access. The methods of the present invention further permit the data downloads to be scheduled, for example, during nonpeak hours of internet or network usage, and/or at predetermined intervals. Additionally, the apparatus described in the methods of the present invention comprise a system for downloading web-based data.

20 Claims, 4 Drawing Sheets

AUTOMATIC DOWNLOAD TO PRINT JOB RETENTION

FIELD OF THE INVENTION

The present invention relates to methods and apparatus by which a network peripheral device may facilitate the printing of documents and images downloaded from the World Wide Web or other network. More specifically, the present invention provides methods and means for directly downloading and storing information from the World Wide Web or other network by use of printer configured with an embedded Web server.

BACKGROUND OF THE INVENTION

The World Wide Web ("Web"), the leading information retrieval service of the Internet (a worldwide network of interconnected computers) has quickly grown into a widely accepted vehicle for the dissemination of information. The explosive growth of the Web is due, in part, to the enormous volume of information available, along with the ease with which the information can be accessed by Web users.

Presently, individuals, businesses, and government offices alike regularly rely on the Web for their information needs on a daily, if not minute-by-minute, basis. E-mail and electronic access to newspapers, financial reports, journals, and various specialized computer databases are just a few of the many convenient uses afforded by the Web to its users. With numbers of Web servers linked to the Web expanding daily, the advent of faster connection speeds, and the ever increasing dependency on the Web by corporate, government and private interests, the tremendous growth of the Web can be expected to continue for years to come.

Typically, users in an office setting access the Web via a workstations linked to a network architecture routed to the Web, while individuals in home setting access the Web using a modem in a Point-to-Point Protocol (PPP). A schematic of a typical network architecture 10 is shown in FIG. 1 in which multiple workstations 12 are bi-directionally connected to a local area network (LAN) server 16 via a connective path 15, which may include twisted-pair wire, coaxial cable, fiber optic, radio wave or other wireless transmission, or other interconnection types. Each workstation 12 is configured with its own CPU with which it executes software programs, such as Web browser programs, stored on the workstation or on other accessible devices. Workstations 12 are capable of generating data files which can be internally stored or transmitted to LAN server 16 for further disposition. Workstation 12 is also capable of receiving data files from LAN server 16.

Workstations 12 are typically provided with a network interface card ("NIC") 14 which is designed for the particular type of network, and which contains protocol rules and encoding specifications for sending and receiving data to and from LAN server 16, and to and from any other devices linked to LAN server 16. The protocols specified by NIC 14 determine, for example, the type of error checking to be used, the data compression method (if any), the means by which the sending device will indicate it has finished sending a message, and the means by which the receiving device will indicate it has received a message. Thus, by means of the network interconnections and the NIC 14, each workstation 12 can access data and devices also interconnected with LAN server 16. LAN server 16 is shown connected to a network peripheral device also containing an NIC 14, in this case a printer 18, which may be shared by workstations 12 via connections to LAN server 16 (i.e., printer 18 is a shared resource). A workstation 12 may also have a printer 18 directly connected to it.

LAN server 16 typically comprises a specially configured computer or device adapted for managing various resources connected to the LAN server 16 and network architecture 10. Many servers are "dedicated" in that they perform no other tasks besides their server tasks. For example, servers may be dedicated to managing network traffic (network servers), disk drives (file servers), or printers (print servers). One or more servers of varying types are typically found in a office-type network architecture.

In relation to LAN server 16, protocols specified by NIC 14 determine whether the network 10 uses a peer-to-peer or client/server architecture. Most commonly, a client/server architecture is used. Typically, "clients" are applications that run on workstations 12 and rely on a server to perform in certain operations. For example, an e-mail client is an application that enables a workstation 12 to send and receive e-mail via LAN server 16 and an e-mail server 28, 29. Clients may rely on servers for interconnection with other devices, web access, resources (such as files), and in some cases, processing power.

In a typical network architecture 10, a LAN server 16 supports a Hyper Text Transfer Protocol (HTTP), the underlying communications protocol used by the Web. HTTP is also supported by NICs 14 on workstations 12, and defines how messages are formatted and transmitted on the Web, and what actions Web servers 24 and Web browsers should take in response to various commands. HTTP uses the Transmission Control Protocol (TCP) to transport all of its control and data messages from one computer to another. Although HTTP is most commonly used, Web browsers also may send network requests for information using other protocols, such as Simple Mail Transfer Protocol (SMTP) (commonly used to support e-mail clients), Gopher document protocol, File Transfer Protocol, etc.

Web servers 24 are remotely located on the Web 26 and are based on the client/server model, being responsible for storage and responsive retrieval of text, graphics, and other information. Well-known files which are typically transferred between a Web browser and a Web server 24 include Hyper Text Markup Language ("HTML") files, the HTML dictating how Web pages are to be formatted and displayed on a Web browser. Other common file types include Graphical Interchange Format ("GIF") files (bit-mapped graphics files found on the Web that use data compression techniques), Joint Expert Photographic Group ("JPEG") files (a lossy compression technique for color images), and Java applets (small platform independent Java-encoded applications that may be downloaded from a Web server to run on a workstation having a Java-compatible Web browser).

LAN server 16 is also connected to router 22, which provides a connection and access to the Web 26 for LAN server 16, and its interconnected workstations 12. Router 22 primarily functions to monitor Web functions by routing data (IP-packets) generated by workstations 12 through an HTTP server (not shown), and also by distributing data intended for workstations 12 or other devices on LAN server 16. An HTTP server may be provided as part of local network architecture 10, or more commonly by an Internet Service Provider ("ISP") to the Web 26. By requesting a specific network address linked to the Web, router 22 can transmit data between a workstation 12 and a particular Web server 24 linked to the Web network 26 using the HTTP protocol.

For e-mail transmission, an e-mail client on a workstation 12 typically interacts with an SMTP server 28, which directs outgoing mail through the Web 26 to the Domain Name Server (DNS) specified by a particular email address. A POP3 (Post Office Protocol) server 29 receives and distributes incoming e-mail according to commands issued by a recognized e-mail client which has successfully logged on to it. Although two different servers, SMTP server 28 and POP3 server 29 commonly run on a single machine (hereinafter referred to as an "e-mail server"). As in the case of an HTTP server, SMTP server 28 and POP3 server 29 may be provided as part of a local network architecture 10, or by a remotely located internet service provider.

To access the Web 26, a user at a workstation 12 typically activates a graphical user interface software application used to locate and display Web pages, commonly called a Web browser, which will usually be stored on the hard drive of workstation 12. Well-known Web browsers include Netscape's Navigator® and Microsoft's Internet Explorer®. The activation of the Web browser on a workstation 12 initiates a suitable network connection to LAN server 16 and router 22 which, in turn, establish a connection to an HTTP server and the Internet (Web) 26.

To connect to a desired website having retrievable information, a network address designated a Uniform Resource Locator (URL) is entered into the Web browser. The URL identifies both the location of the site and one or more pages of information contained at that site, which is supported by a particular Web server 24. At each URL, one or more Web pages of text, graphics, or other information is stored on Web Server 24 in a pre-defined hierarchy. The URL address may be supplied by the user in variety of ways, to include direct keyboard entry of the address, selection of a previously stored "bookmarked" address, or "clicking" on an appropriate hyper-text link appearing on a Web browser control bar or on a displayed Web page. Using the URL, the Web browser sends a command in the form of a retrieval request to the proper Web server 24 identified in the URL address. For example, when a URL is entered into a Web browser, the Web browser sends an HTTP command to Web server 24 directing Web server 24 to fetch (download) and then transmit the requested data (Web page) identified by the URL.

The instructions sent by the Web browser are interpreted and executed by Web server 24. The requested data is then transmitted by Web server 24 over the Web back to router 22 and LAN 16, where the file is distributed over the local network to the requesting workstation 12. The Web browser then assembles and displays the file by processing, for example, the HTML source code, allowing the user to view the text, graphics or other information rendered on the local display of workstation 12.

Web servers 24 are increasing included as a part of office network architectures where they can be locally maintained and conveniently upgraded, rather being situated at distally located ISPs. Normally, a Web server 24 will be dedicated as a stand-alone server with a direct connection to the Internet. A recent variation in the traditional use of Web servers, however, is disclosed in U.S. Pat. No. 5,956,487 to Venkatraman et al. ("Venkatraman et al."), assigned to the assignee of the present invention. Venkatraman et al. describes a Web-based server configured to be embedded on networked devices, including printers, faxes, copiers, communication devices, etc. The embedded Web server is disclosed to provide Web and network-based access to the device through a device URL and associated device Web pages, which may be conveniently accessed by conventional Web browsers. In addition to eliminating the costs of providing a screen-based user interface mechanism, the embedded Web server advantageously makes use of HTML transported according to HTTP, which enables communication with a Web browser independently of the user's particular computer system platform executing the browser. Accordingly, the embedded Web browser disclosed by Venkatraman et al. allows convenient remote user access of a configured device by means of the Web.

In accessing remotely located Web servers, however, the time it takes for the data to be transmitted over the Web may vary substantially, being principally dependent upon the bandwidth ("pipeline") of the internet connection, the size of the files, and the processing speed of the Web server. Bandwidth and file size are particularly determinative of data transmission speed, bandwidth referring to the amount of data that can be transmitted over the Web network in a fixed amount of time. Bandwidth is usually expressed in bits per second (bps) or bytes per second, and is directly proportional to the amount of data transmitted or received per unit time. For example, more bandwidth would be used to download a digitized photograph in one second than it would take to download a page of text in one second.

The bandwidth of a network connection, being a finite value, can dramatically affect transmission speeds in the situation where multiple users, such as multiple users on workstations 12, are accessing the Web during the same time frame. While bandwidth is less of an issue when multiple users are accessing the Web intermittently, resulting in sporadic transmissions of data, problems may arise in the event that one or more users requests large amounts of data to be sent in a steady and continuous stream. Such "streaming" may result, for example, when particularly large files are downloaded, such as graphics files, software programs, large textual documents, electronic newspapers, etc., and in the case when one or more users is retrieving large multimedia files. Furthermore, many businesses, offices, and individuals share bandwidth with other non-associated Web users (i.e., have non-dedicated internet connections), further reducing the bandwidth available for data transmission. In some settings where dependence on the Web is high, the slow data transmission speeds that may occur as a result of network congestion might critically affect productivity, or even lead to missed business opportunities. In a business setting using a less than optimum bandwidth, the problem of network congestion is exacerbated by the fact that the majority of Web users will be connected via the same bandwidth "pipeline" during peak business hours (9 am–5 pm).

Even assuming a bandwidth sufficient for multiple simultaneous use and large downloading operations, the serial interaction between a conventional Web browser and a user results in a time lag that is fairly inefficient and wasteful of both processing and worker productivity time. Specifically, the user takes time and effort to activate the Web connection and input the desired URL. The Web browser then processes the user input and sends out the proper data request. If the requested file is large, the user must typically wait some time until the information is transmitted, routed, received by a Web server, processed by the Web server, transmitted by the Web server, assembled by the browser, and then displayed on the user's workstation monitor.

U.S. Pat. No. 6,134,584 to Chang et al. ("Chang") and U.S. Pat. No. 6,067,565 to Horvitz ("Horvitz") disclose downloading techniques for dealing with network congestion. Chang describes a method in which an "Internet Data Download Scheduler" ("Scheduler") is provided on a user's machine to download web-based documents at a specified scheduled time. The Scheduler of Chang is further disclosed to enable a user to download under prescribed bandwidth conditions, and to allow the machine to be activated from an "off" status in order to initiate the download process. Chang, however, provides little detail as to how the scheduling methods are to be accomplished.

Horvitz discloses techniques of "prefetching" web pages during periods of low processing and low network activity, and then storing those pages in the cache of a user's machine for expedited access. The "prefetched" pages are those computed to be likely to be accessed in the future based on analysis of a user's Internet usage. The methods of Horvitz, however, are based on a probabilistic user model, and do not allow a user to specify or schedule a particular desired download.

If the user desires to print a hardcopy of the information, the process is accordingly more complex and takes additional time. To print, a user at workstation 12 uses driver software to load documents or images into a buffer (usually an area on a disk of a workstation), where a printer 18 pulls them off the buffer at its own rate (See FIG. 1). The user may also use the driver software to manually adjust the print attributes, such as the image options (e.g., resolution, background), image orientation (landscape, portrait, etc.), colors, number of copies, duplex (double-sided) or single-sided printing, or other printing parameters.

A network printer 18, however, can print only one job at a time, yet must be available at all times to multiple users. For this reason, local network architectures 10 will typically incorporate a dedicated print server, also known as a print spooler 20. Print spooler 20 is a device that accepts requests for printer resources, and then allocates the use of printer resource according to a set of specified rules. When a print spooler 20 is present, users can send their data through the print spooler 20 rather than directly to the printer 18.

Upon receiving data destined for one or more printers 18, print spooler 20 writes this data into a temporary file instead of sending it immediately to a printer. For example, when a single user or multiple users initiate commands on workstation(s) 12 to print a number of documents, print spooler 20 queues the documents by placing them in an interim holding area called a print buffer or print queue. The printer then pulls the documents off the queue one at a time. Later, when the printer becomes available, the print spooler 20 will write the data to the printer.

The order in which a print spooler 20 executes jobs on a queue depends on the priority system being used. Most commonly, jobs are executed in the same order that they were received on the queue (i.e., on a first in first out basis), but in certain jobs can be given higher priority dependent upon the particular system scheme. Typically, a particular print job will remain on queue until printed, at which time incoming print jobs may be allow to overwrite the print request. Spooling thus lets multiple users place a number of print jobs on a queue instead of waiting for each one to finish before specifying the next one. The operating systems of individual workstations are also often configured with print spoolers specific for the particular workstation.

For large Web based documents that need to be downloaded and printed, and particularly for documents needed on a recurring basis, the combination of user interaction time, download time, possible network congestion, and printer queuing operations, may cause network and user resources to be squandered during times normally associated with peak productivity. Therefore, a need exists in the art for convenient apparatus and accompanying methods for automatically downloading, storing, and printing documents and images from the Web, particularly during intervals of low or idle network, microprocessor, and bandwidth activity. Such apparatus and methods would advantageously free up network and user resources, thus increasing network and worker productivity.

BRIEF SUMMARY OF THE INVENTION

The present invention provides methods of using an embedded Web server on a printing device to automatically download desired web-based data from a remote Web site, as well as methods for storing the downloaded information in a printer-associated cache (job retention) for later printing and/or access. Generally, the methods of the present invention comprise providing a printer incorporating an embedded web server linked to a network; initiating a data download request via a Web-based device by specifying a network address to the embedded Web server; communicating at least one data download command for the data from the Web server to a responsive server supporting said network address; receiving the downloaded data by means of the Web server; and storing the downloaded data in the cache memory of the printer for later access and/or printing. The methods of the present invention further permit the data downloads to be scheduled, for example, during nonpeak hours of internet or network usage, and/or at predetermined intervals.

In a preferred embodiment, a Web-based device such as a computer workstation, phone, or PDA uses an SMTP client to request the embedded Web server to send commands to a responsive data server for certain Web-based data. The SMTP client may also specify various data download parameters relating to the operation of the Web server, including the scheduling of data download requests.

In another preferred embodiment, the embedded Web server generates a Web page form which may be accessed by a conventional Web browser. The Web page form provides a plurality of open data fields which allow a Web browser user to interface with the Web serve for purposes of requesting and scheduling data downloads. The user interface options on the Web page will also preferably allow the Web browser to specify various data download parameters.

The methods of the present invention advantageously allow a printing device containing an embedded Web server to act as an additional workstation, and further allow a user to download documents, graphics and other remotely stored data directly to a printer and at times which optimize bandwidth, data transmission speeds, and worker productivity. Additionally, the apparatus described in the methods of the present invention comprise a system for downloading web-based data.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
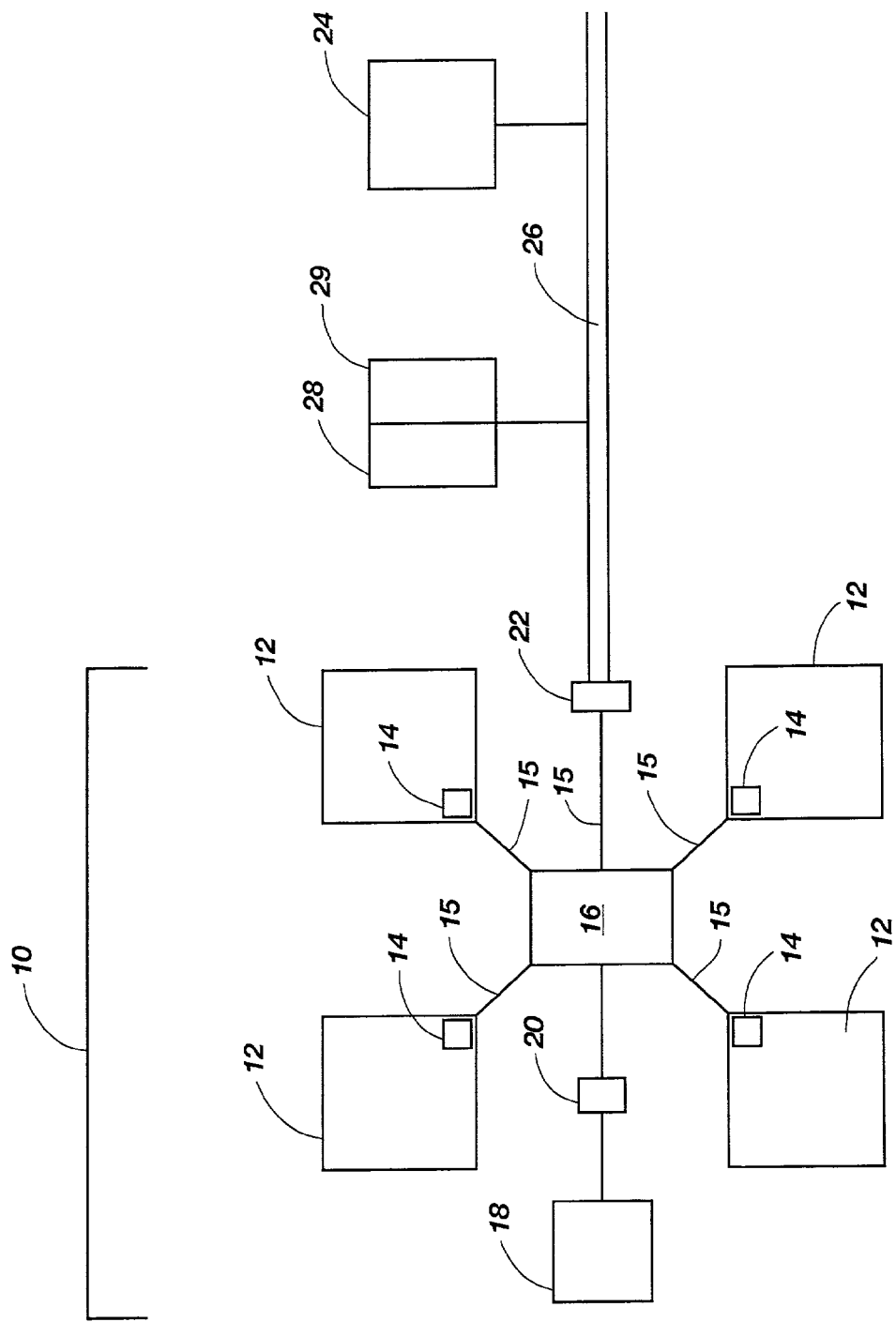
FIG. 1 is a top-level schematic diagram of a typical local area network interconnected with the World Wide Web.
Figure 2:
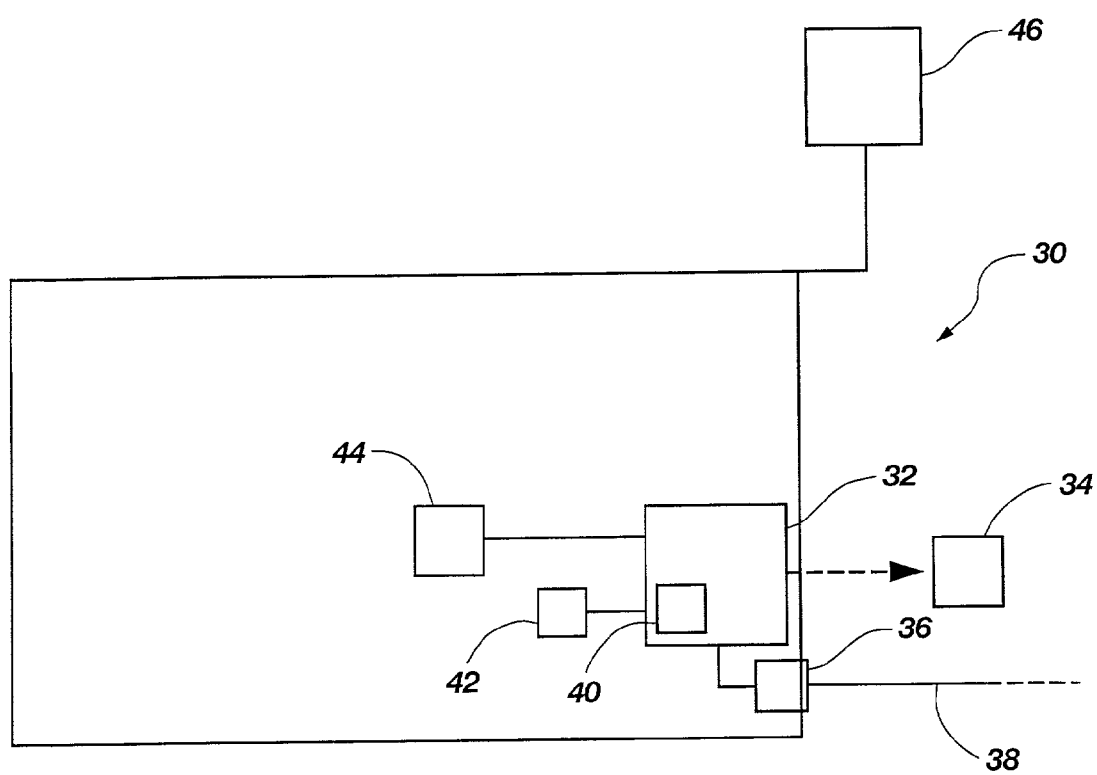
FIG. 2 is a block diagram of a printing device configured with an embedded Web server for use in the methods of the present invention.

As illustrated in FIG. 2, a preferred device for carrying out the methods of the present invention includes a printing device 30 configured with both printer specific hardware and software and an embedded Web interfacing system for enabling access and interaction with other devices linked to local and external communication networks ("networks"), including the World Wide Web, a local area network, an intranet, the computer network of an on-line service, etc. Printer specific hardware and software of printing device 30 may be provided in any conventional printer configuration known in the art, including those associated with laser printers, impact printers, photographic printers, and inkjet printers. Printing device 30 includes one or more local displays 46, which may comprise a conventional monitor, a monitor coupled with an integrated display, an integrated display (e.g., LCD), or other means for viewing print queues, downloaded web pages, and associated data or processing information, including printer specific information. Printing device 30 also includes a network interface (I/O) 36 for communication with one or more and preferably all of the various networks (LAN, WAN, Internet, etc.) through communication paths or links known in the art, including wireless connections, ethernet, bus line, Fibre Channel, ATM, standard serial connections, and the like.

In a preferred embodiment, the embedded Web interfacing system comprises a Web server 32 providing web server functions to requesting users linked to one or more of the various networks (LAN, WAN, Internet, etc.). The preferred device of the present invention may thus be the same or conceptually similar to the printer apparatus configured with an embedded Web server described in U.S. Pat. No. 5,956,487 to Venkatraman et al., previously discussed, the disclosure of which is incorporated by reference herein in its entirety.

Still referring to FIG. 2, the embedded Web server 32 of the present invention is preferably housed in printing device 30 on a single microprocessor board (not shown), which includes a microprocessor 40 responsible for controlling all aspects of Web server 32, and wherein communication protocols and executable programs relating to the Web and the display of Web pages are stored in ROM. Microprocessor 40 is preferably part of the existing circuitry associated with a conventional printer. As such, microprocessor 40 is preferably configured to perform some or all of the printer specific functions of printing device 30, including control of printer specific hardware and software. Microprocessor 40 is also provided with memory 42 in the form of RAM and/or hard disk memory, which may be associated with the print cache of printing device 30, or which may be provided separately from the print cache. In one embodiment, a percentage of memory 42 in printing device 30 may be dedicated to Web server 32. Alternatively, Web server 32 may share the available memory 42 in printing device 30 with the print cache. Typically, printing device 30 will be equipped with a minimum of 64 megabytes of RAM, although less RAM may be used in certain configurations.

Printing device 30 also will preferably contain executable software programs stored on a hard disk 44 for operation of Web server 32. Hard disk 44 may also contain printer specific software programs relating to the operation of printer specific hardware. Alternatively, a separate hard disk (not shown) may optionally be provided with the requisite software programs for printing. In a most preferred embodiment, Web server 32 uses microprocessor 40 and the ROM-stored protocols to exchange data with other devices/users on one or more of the networks via Hyper Text Transfer Protocol (HTTP) and Simple Mail Transfer Protocol (SMTP), although other protocols such as File Transfer Protocol (FTP), Simple Network Management Protocol (SNMP), and Gopher document protocol may also be supported. Web server 32 is further configured to send and receive HTML formatted files.

Using microprocessor 40, associated software, and internal circuitry of printing device 30, Web server 32 supports one or more control operations that relate the function of printing device 30. Preferably, Web server 32 is configured to support the complete set of printing operations of printing device 30, including operation of the printing device cache memory 42.

In addition to being linked to a local area network (LAN) or wide area network (WAN), printing device 30 is preferably linked directly to the Internet via network interface 36 and communication links 38 attached thereto. Embedded Web server 32 within printing device 30 is provided with at least one Uniform Resource Locator (URL), by which it is identified on a network, and which can be accessed via HTTP, for example, from a remotely located workstation over a LAN, WAN, or over the Internet. A Web server 32 may also be accessed by other web devices in a peer-to-peer relationship. Additional URLs may be provided for components of printing device 30 that have differing functions For example, a URL may be provided for a component of printing device 30 which is capable of performing facsimile functions.

Web server 32 preferably generates at least one web page (HTML page) 34 that provides an interface for printing device 30 that can be accessed by a remote workstation or other internet-based device via a browser client with the appropriate URL address. Since Web server 32 supports SMTP protocol, Web server 32 can also be accessed via an e-mail client. Using microprocessor 40, associated software, and internal circuitry of printing device 30, Web server 32 supports one or more control operations that relate the function of printing device 30. As previously discussed, Web server 32 is preferably configured to support the complete set of printing operations of printing device 30, to include: decoding transmitted information to be printed, storing print jobs in cache memory 42, printing from cache memory 42, and querying the status of print jobs stored or previously stored in cache memory 42.

The present invention provides methods of using Web server 32 of printing device 30 to automatically download desired data from a remote Web site, and to store the downloaded information in a printer-associated cache (job retention) for later printing. The term "data", as used herein is intended to mean text, graphics, combinations of text and graphics, and other distinct items of information. Generally, the methods of the present invention comprise providing a printer incorporating an embedded Web server linked to a network; initiating a data download request via a Web-based device by specifying a network address to the Web server; communicating the network address over the network to a responsive server; receiving downloaded data sent by the responsive server by means of the Web server within the printer; and using the Web server to store the downloaded data in printer job retention. Additionally, the apparatus described in the methods of the present invention comprise a system for downloading Web-based data.

The methods of the present invention advantageously allow a printing device containing an embedded Web server to act as an additional workstation, and further allow a remote user to download documents, graphics and other remotely stored data at times which optimize bandwidth, data transmission speeds, and worker productivity.

In a preferred embodiment according to the present invention (FIG. 3), an embedded Web server 52 of a printing device 50 is provided with an e-mail account and e-mail ID (sender/recipient name) associated with, and recognized by, an e-mail server 54. E-mail server 54 may be incorporated as an integral part of a local network architecture, or may be provided by an ISP. Web server 52 and printing device 50 are configured as previously described in relation to FIG. 2.

In a first step, a user opens an SMTP client (e.g., an e-mail client) 56 from a Web-based device 58, such as a remotely linked workstation, Web-equipped phone, personal digital assistant (PDA), etc., to enter data into an e-mail message specifying one or more URL addresses corresponding to desired data contained in, or otherwise accessible by, a second Web server 60 (hereinafter referred to as "data server 60") responsive to download requests. For example, a user may specify a URL corresponding to an electronic newspaper stored in a particular data server 60. The e-mail client 56 may be a conventional e-mail client known in the art, such as GroupWise® by Novell or Outlook® by Microsoft, or may be an e-mail client specially designed for the methods of the present invention. Data server 60 may be internal or external to a LAN or WAN, but in any event is connected via a communication path or link to Web-based device 58.

The user also specifies the recipient e-mail address (i.e., the e-mail server domain name and e-mail ID of printing device 50) to e-mail client 52. Other information, such as instructions for scheduling download times, a user ID and password to be submitted to a restricted access data server 56, minimally acceptable bandwidth transmission parameters, instructions for downloading to a particular directory and/or directory address located within printer cache of printing device 30, whether to scan for viruses in downloaded files, whether to download graphics associated with text, etc., may also be incorporated within the message to be sent by the e-mail client 56 to Web server 52. The name of the user and/or the IP address of the Web-based device 58 will generally also be included as part of the e-mail to Web server 52. Descriptive information regarding the data to be downloaded may also be included, and a particular file name may be assigned to the data file to be downloaded.

The one or more URLs, and any other information specified by the e-mail message to be transmitted to Web server 52, may be incorporated in a text box associated with e-mail client 56, provided as an attachment to an e-mail message, or may simply be placed in the "subject line" of an e-mail message. One of skill in the art will recognize that specific commands to Web server 52 for carrying out instructions associated with retrieving the desired URL(s) can be, for example, embedded within e-mail client 56 and/or user-specified. Commands and data sent by e-mail client 56 to Web server 52 may be processed by microprocessor 62 into instructions which are recognizable and capable of execution by Web server 52.

The user will then typically transmit the completed e-mail carrying the desired URL(s), and associated instructions (if any), over a communication path or link leading to Web server 52. In an office setting, the communication path or link will typically comprise interconnections 53 within a local area network. For users outside of a local area network the communication path or link may also include the Web 63. Upon receipt of the e-mail sent by e-mail client 56, the URL(s) and associated instructions are interpreted and processed by a microprocessor 62 associated with Web server 52. As previously discussed in relation to FIG. 2, microprocessor 62 will typically be responsible for controlling all aspects of Web server 52. By way of microprocessor 62, Web server 52 will execute the instructions as specified in the e-mail, or alternatively, per default settings designated by e-mail client 56 and/or microprocessor 62.

In a related embodiment, a user may specify the URL(s) to Web server 52 by way of a "Save As" command on a conventional or specially designed e-mail client 56. Using the "Save As" command, the data downloading instructions may be sent to a specific directory within printing device 50. The directory may then be accessed by Web server 52 in order to retrieve and process the URL(s), and to retrieve and process any downloading instructions and/or other data associated with the download request.

The instructions specified in the e-mail may request Web server 52 to access to the desired URL(s) immediately, or may schedule a later time and date for initiating a command to access and download the desired data. Later times and dates for scheduling data downloads may be desirable, for instance, to avoid peak periods of bandwidth use, busy servers, peak periods of microprocessor 62 use, more expensive internet connection charges, etc.

Various intervals or frequencies for data downloads can also be scheduled. In this regard, an e-mail request for a data download to Web server 52 may specify that one or more particular URLs be accessed, and data downloads initiated, at periodic intervals. A user may find this option particularly desirable for accessing URLs in which new data is posted at such regularly recurring intervals. For example, a user could schedule intervals for the downloading of data which is periodically offered by various newsgroups. The scheduling of data downloads may also be conveniently tied to a "task" and/or "calendar" function of an e-mail client 56. A user could then use the "task" and/or "calendar" function of an e-mail client 56 to refer to, enter, or amend scheduling times or data associated with a scheduled data download.

In the event a time and date for a data download has been scheduled, an internal timer associated with Web server 52 will schedule Web server 52 to initiate access to the URL(s) at the later requested time(s). The internal timer may also be configured to automatically "power up" Web server 52 at the scheduled download time, allowing printing device 50 to be turned off prior to the download time. The instructions specified by the e-mail may also provide for a particular download request to be automatically rescheduled in the event communication links are down, sufficient bandwidth is not available, or the data transmission request fails for any other reason. Instructions may also be specified which direct Web server 52 to probe the probe network for adequate bandwidth during designated hours, for example, by using a Packet Internet Gopher ("ping") utility stored in ROM or on a hard disk of printing device 50.

Pursuant to the instructions in the e-mail sent by e-mail client 56, Web server 52 initiates a data download by sending commands, preferably pursuant to conventional HTTP protocols, via communication links to the data server 60 location specified by the requested URL. The commands instruct data server 60 to access and download data found on the Web page specified by the URL address, and then to transmit that data back to Web server 52 of printing device 50. An ID and password may be supplied by Web server 52 for download requests sent to restricted access servers and databases. The ID and password may be provided by a user in the text of an e-mail message, or may be stored in memory of printing device 50 and associated by microprocessor 62 with a particular user, URL, and/or Web-based device 54.

The requested data from data server 60 will typically be transmitted over the Internet 63 to Web server 52. Pursuant to instructions from Web server 52, data server 60 may also or alternatively send the requested data to a file server, workstation, or other Web-based device. When received by Web server 52, the requested data is translated by microprocessor 62 in association with translation software stored in ROM or a hard disk of printing device 50, the translation software similar to conventional driver and compiler software. Upon translation, the data is stored in the printing cache (job retention) 64 of printing device 50, which may be RAM, hard disk memory, or a combination thereof as previously described. Although job retention 64 for purposes of the present invention may be dedicated memory within printing device 50, job retention 64 will typically be configured as a conventional printing cache. Preferably, the user name, the accessed URL, the IP address of Web-based device 58, and/or other information identifying the requesting user, accessed website, or requesting Web-based device 58 will be associated with the data stored in job retention 64.

Once in the requested data is stored in job retention 64, the status of the requested data (and of any other individual print jobs) may be queried, for example, using a conventional Web browser of a Web-based device 58 (such as a Web browser on a remote workstation). To query the status of data stored in job retention 64, a user on a workstation may specify the "homepage" of Web server 52 by entering the URL of Web server 52 into the browser, whereupon the Web server 52 may respond by displaying a "printer status page." The "printer status page" may be accessed directly, or indirectly, for example, by displaying "homepage" links to Web pages generated by Web server 52 which relate to the operation and status of printing device 50.

In addition to displaying the status of individual print jobs via a Web page, Web server 52 is configured to receive print commands from a remote Web browser. Thus, a user may access a printer status Web page and scroll through the queued print jobs displayed thereon in order to identify the requested downloaded data. Once the desired print job has been located, the print job could be printed at any time by, for example, selecting the job name through a user interface-enabled control panel menu displayed by Web server 52. The control panel menu displayed by Web server 52 will also preferably contain a variety of conventional printing options, such as number of copies to be printed, pages to be printed, image options, paper output options, paper size, and the like. Of course, the status of the downloaded data can also be displayed and accessed by the local display and controls of printing device 50. Similarly, local controls on printing device 50 may be used to print the downloaded data.

Web server 52 is also preferably configured to extract data stored in job retention 64, and to transmit that data on demand to an authorized requesting Web-based device. For example, a remote user on a workstation may access Web server 52 by way of a Web browser using a communication path through the Web. By using the browser to interface with Web pages generated by Web server 52, the user may query the status of existing print jobs in job retention 64, review any descriptive information associated with an existing print job, and then request Web server 52 to download the data and transmit it to the user's workstation, or even to another Web-based device, such as a second printer. When requesting that the data in job retention 64 be sent to a third party Web-based device, Web server 52 could provide a CGI script-based form for the user to fill out in order to specify the Web-based location to which the data will be directed.

Upon receipt or failure to receive the requested data, Web server 52 is preferably configured to send an e-mail notification of a successful or unsuccessful download to the requesting user, or to requesting Web-based device 58. One of skill in the art will recognize that various other messaging systems, such as "instant messaging" over a network, may alternatively be employed to notify a user of the download status. The status of the downloaded information can also appear directly on a specific Web page generated by Web server 52 and which can be accessed by an identifying URL. The displayed Web page will preferably further contain an applet for sending print commands to printing device 50 for the printing of the downloaded data.

The downloaded data may remain in job retention 64 for a predetermined time, and where it will remain until such time as the data is printed or otherwise overwritten. For data downloads scheduled to occur at regular intervals, the downloaded data will typically remain in job retention 64 until the occurrence of a specified later interval when new data from the same Web site, network site, or database file has been downloaded, or until a user has determined that the data should be overwritten, either manually or by automatic operation of printing device 50.

Figure 4:
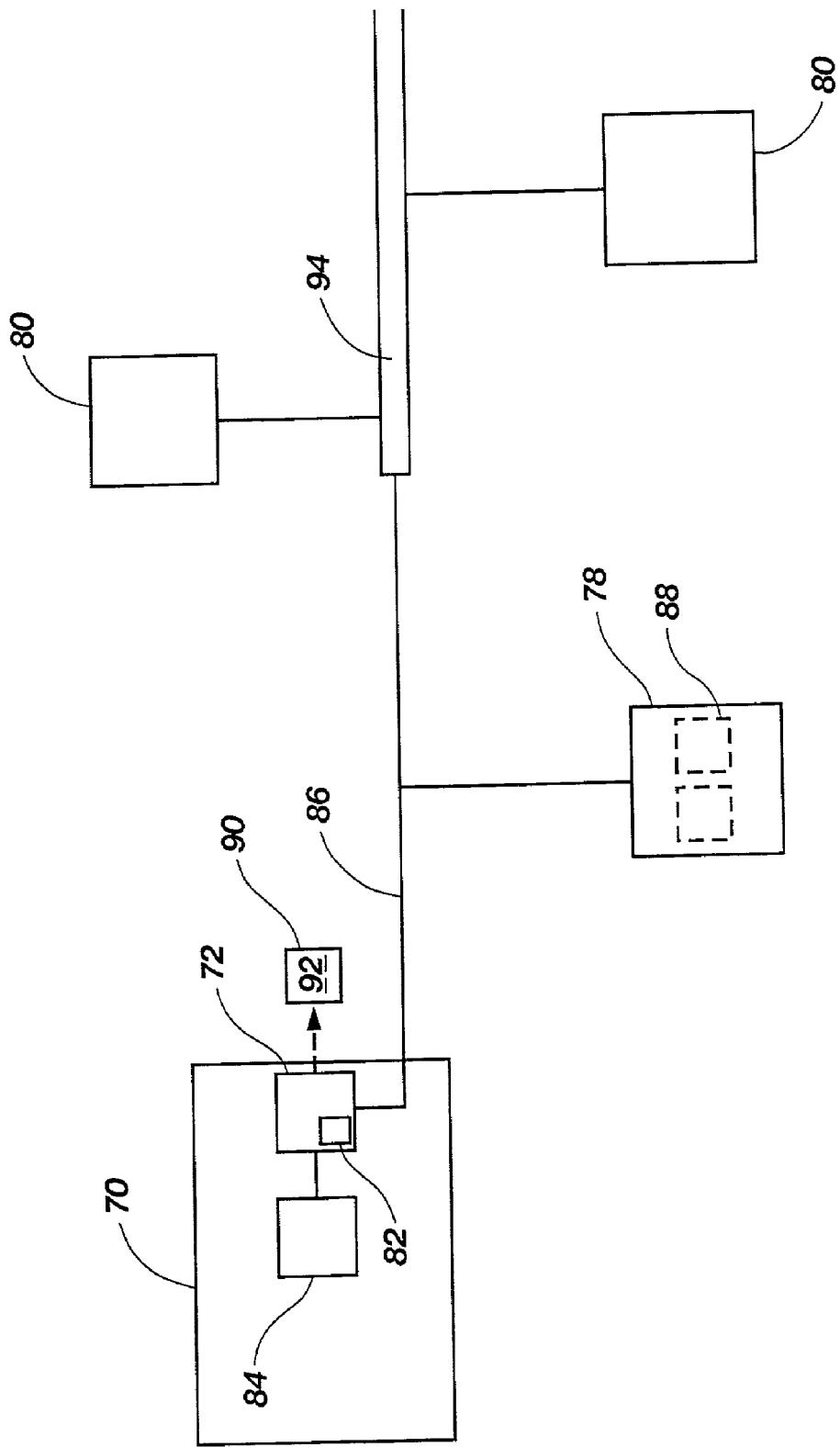
FIG. 4 illustrates an alternate embodiment of the system of network components shown in FIG. 3.

In another embodiment of the present invention as shown in FIG. 4, a printing device 70 is provided as previously configured in relation to FIG. 2. In this embodiment, an embedded Web server 72 on printing device 70 generates an interactive Web page 90 configured for the entry of one or more data download requests.

To initiate the download of specific textual or graphical data stored in, or accessible by, a remotely located data server 80 linked to the Web or office Intranet, a remote user may activate a Web browser 88 on a workstation or other Web-based device 78, and then specify therein a URL associated with Web server 72 on printing device 70. Web browser 88 then communicates download commands via HTTP to Web server 72, which, in turn, processes the HTTP commands and generates a Web page 90 providing information relating to the functions and operating status of printing device 70.

At least one Web page 90 generated by Web server 72 contains a data entry form 92 having one or more fields for data entry with which to enter one or more URL addresses. The data entry form 92 is preferably devised using Common Gate Interface (CGI) script, which may be executed when the script's URL is requested by Web browser 88. The user utilizes the fields provided by data entry form 92 to enter URL addresses corresponding to data (text, graphics, etc.) obtainable by a remote Web server 72, as well as other download parameters.

Preferably, the data entry form 92 on Web page 90 will also contain data entry fields for scheduling data download requests for a specific time or at specific intervals. For instance, data downloads may be scheduled to avoid time periods of peak bandwidth or microprocessor 82 usage. An internal timer associated with Web server 72 and the microprocessor 82 of printing device 70 will preferably assist in scheduling as was previously described in relation to FIG. 3. Other data fields of data entry form 92 may include fields for the entry of a user ID and password associated with a restricted access server or database, minimum bandwidth transmission parameters, instructions for loading text and/or graphics, instructions for downloading to a particular directory and/or directory address located within printer cache of printing device 70, whether to scan for viruses in downloaded files, and the like.

The data entry form 92 will be associated with an java applet, or other executable software, which is executed by microprocessor 82 of Web server 72. Execution of the applet provides Web server 72 with the download instructions specified in data entry form 92. According to the download instructions, Web server 72 initiates a data download by sending HTTP download commands, and optionally other information such as an ID and a password, via a communication path to a data server 80 specified by the URL. The communication path will typically include a local path 86 and the internet 94. The data server 80 acts on the download commands to access and download data identified by the URL. The data server will then typically transmit the requested data to Web server 72, whereupon the information is stored translated and stored in job retention 84 of printing device 70. Alternately, instructions sent to data server 80 may specify that the data be transmitted to a file server, workstation, or other Web-based device.

Figure 3:
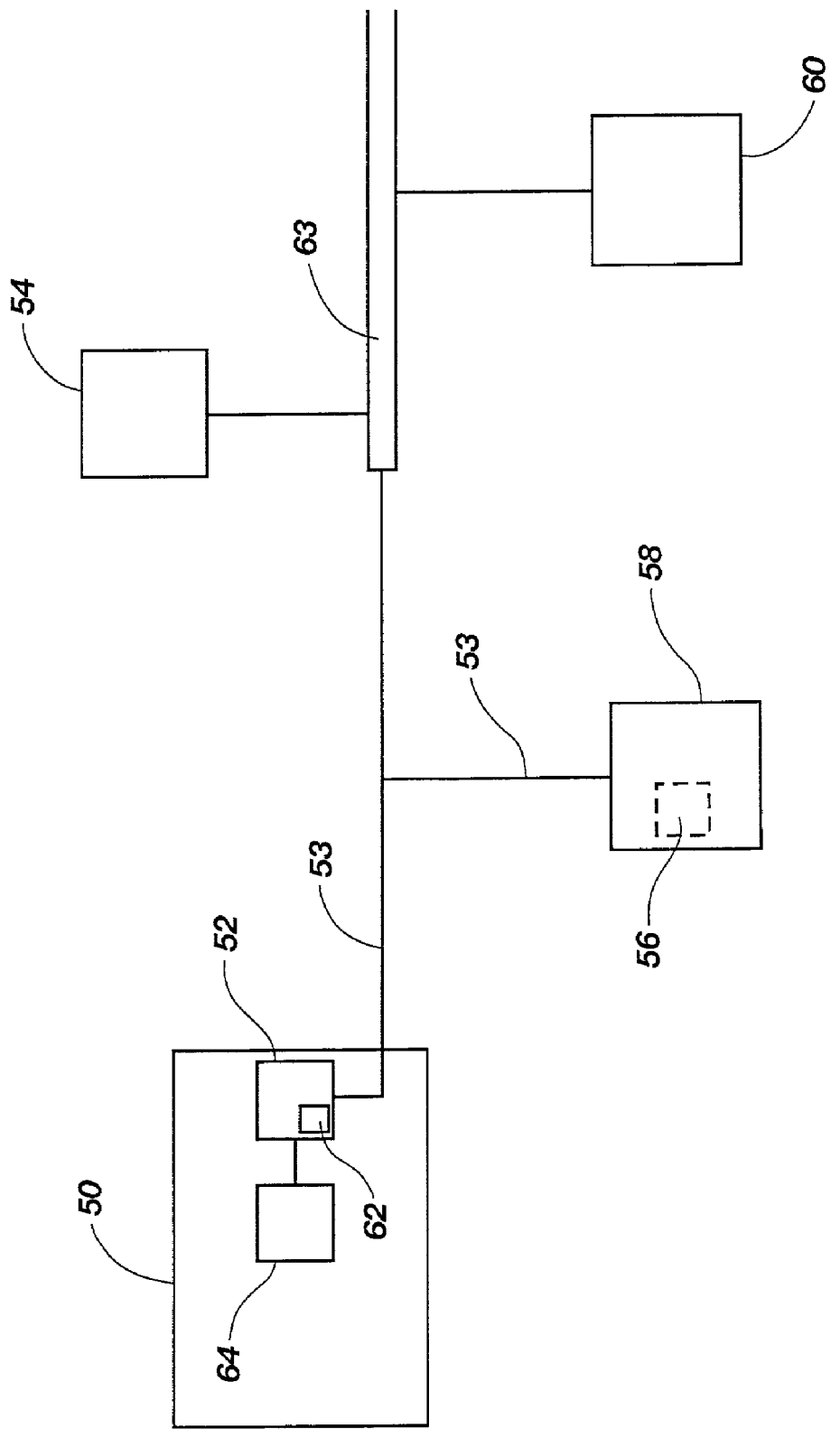
FIG. 3 illustrates a system of network components used in the methods of the present invention.

All other steps relating to data stored in job retention 84 are as previously described in relation to FIG. 3.

The above-described apparatus and methods according to the present invention provide convenient techniques of using an embedded Web server on a printer to: specify specific scheduling and other parameters for automatically downloading data off the Web; receive and store the downloaded data in print job retention of a printing device; query the status of the downloaded data, and then access or print the data directly from job retention. The methods of the present invention thus advantageously allow an embedded Web server on a printer to act as an additional workstation which may be programmed to effect data downloads during low or off-peak network activity, resulting in the requested data being available for printing or perusal at a predetermined time.

Using the example previously provided regarding the scheduling of download intervals for information electronically offered by various newsgroups, a user may use the methods and embedded Web server of the present invention to conveniently schedule a download to printer memory to occur each day in the morning hours around the time the newsgroup information is first posted. Upon arriving to work in the morning, the user may employ a Web browser on a remote workstation to access a "printer status" Web page generated by the embedded Web server. The printer status page may be used to query the status of the download in printer memory. The user could then either directly access the newsgroup information, or directly print the information by using commands displayed on the Web page.

It will be appreciated by those skilled in the art that the embodiments herein described, while illustrating certain embodiments, are not intended to so limit the invention or the scope of the appended claims. Those skilled in the art will also understand that various combinations or modifications of the preferred embodiments could be made without departing from the scope of the invention.

Once being apprized of the instant invention, additional methods of using the invention will become apparent to one of ordinary skill in the art. For example, the methods of the present invention are applicable to any network using linked devices, regardless of the network scale, and to office intranets in particular. Furthermore, a user could specify instructions to the embedded Web server to print the downloaded data upon its receipt in job retention, either immediately or at a later time.

Thus, while certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. A method of downloading web-based data, comprising:
   providing a printer incorporating a web server, said web server linked to a network;
   initiating a data download request using an SMTP client to said web server by specifying a network address associated with said data;
   communicating at least one data download command for said data from said web server to a responsive remote server supporting said network address;
   downloading said data specified by said network address via said responsive remote server;
   transmitting said downloaded data from said responsive remote server to said web server;
   receiving said downloaded data by said web server; and
   storing said downloaded data in memory of said printer.

2. The method of claim 1, wherein initiating a data download request comprises sending a URL to said web server.

3. The method of claim 2, wherein said URL is sent over said network by an SMTP client of a web-based device.

4. The method of claim 3, wherein initiating a data download request comprises specifying data download scheduling instructions to said web server via said SMTP client, and wherein initiating a data download request comprises initiating said data download request pursuant to said data download scheduling instructions.

5. The method of claim 4, wherein specifying data download scheduling instructions comprises scheduling said data downloads to occur at a plurality of regular intervals.

6. The method of claim 4, wherein specifying data download scheduling instructions comprises scheduling said initiating a data download request at times of nonpeak internet activity.

7. The method of claim 3, wherein said SMTP client comprises conventional e-mail software.

8. The method of claim 3, wherein said web-based device is selected from the group consisting of computer workstations, phones, and personal display assistants.

9. The method of claim 1, further comprising providing a web page generated by said web server, said web page displaying the status of said receiving and said storing of said downloaded data and providing user interface printing options for printing said downloaded data.

10. The method of claim 1, wherein said network comprises the world wide web.

11. The method of claim 1, wherein said network comprises an intranet.

12. The method of claim 1, wherein initiating a data download request comprises initiating a data download request from a remotely located web-based device.

13. A system for downloading web-based data, comprising:
   a web server embedded on a printer;
      said web server configured for display of at least one web page, said at least one web page associated with operative functions of said printer;
      said web server adapted to be linked to a network;
      said web server configured to receive and process data download requests from a web-based device, said data download requests for data associated with at least one remotely located data server;

said web server configured to send download commands to said at least one remotely located data server;

said web server configured to receive downloaded data transmitted by said at least one remotely located data server and to store said data in printer memory; and said web-based device adapted to send data download requests via an SMTP client to said web server for data associated with said at least one remotely located data server.

14. A method of scheduling downloads of web-based data to printer memory, comprising:

providing a printer having an embedded web server linked to a network;

scheduling a data download request via an SMTP client of a web-based device by specifying to said embedded web server at least one network address associated with said data and scheduling instructions for initiating said data download request;

initiating said data download request by following said scheduling instructions;

communicating at least one data download command for said data from said web server to a responsive remote data server supporting said network address;

downloading said data specified by said network address via said responsive remote data server;

transmitting said downloaded data from said responsive remote data server to said web server;

receiving said downloaded data by said web server; and storing said downloaded data in memory of said printer.

15. The system of claim 13, wherein said data download request comprises data download scheduling instructions.

16. The system of claim 13, wherein said SMTP client comprises conventional e-mail software.

17. The system of claim 13, wherein said web-based device is selected from the group consisting of computer workstations, phones, and personal display assistants.

18. The system of claim 13, wherein said at least one web page comprises a web page displaying the status of data download requests and storage of said data.

19. The system of claim 13, wherein said network comprises the Internet.

20. The system of claim 13, wherein said web-based device comprises a remotely located web-based device.

* * * * *

UNITED STATES PATENT AND TRADEMARK OFFICE
CERTIFICATE OF CORRECTION

PATENT NO. : 7,002,703 B2 Page 1 of 1
APPLICATION NO. : 09/765186
DATED : February 21, 2006
INVENTOR(S) : Travis Parry It is certified that error appears in the above-identified patent and that said Letters Patent is hereby corrected as shown below:

In column 2, line 17, after "perform" delete "in".

Signed and Sealed this

Eleventh Day of August, 2009

David J. Kappos
*Director of the United States Patent and Trademark Office*